(12) United States Patent
Saito et al.

(10) Patent No.: US 11,031,618 B2
(45) Date of Patent: Jun. 8, 2021

(54) POLYMER, POLYMER ELECTROLYTE MEMBRANE AND MEMBRANE/ELECTRODE ASSEMBLY

(71) Applicant: AGC Inc., Chiyoda-ku (JP)

(72) Inventors: Susumu Saito, Chiyoda-ku (JP); Hiroyuki Watabe, Chiyoda-ku (JP); Takumi Okuyama, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/363,746

(22) Filed: Mar. 25, 2019

(65) Prior Publication Data
US 2019/0221874 A1 Jul. 18, 2019

Related U.S. Application Data

(63) Continuation of application No. PCT/JP2017/033560, filed on Sep. 15, 2017.

(30) Foreign Application Priority Data

Sep. 27, 2016 (JP) .............................. JP2016-188161

(51) Int. Cl.
*H01M 8/1039* (2016.01)
*H01M 8/1023* (2016.01)
(Continued)

(52) U.S. Cl.
CPC ............ *H01M 8/1039* (2013.01); *C08F 8/12* (2013.01); *C08F 216/1466* (2013.01);
(Continued)

(58) Field of Classification Search
CPC .. H01M 2008/1095; H01M 8/02; H01M 8/10; H01M 8/1004; H01M 8/1023; H01M 8/1039
See application file for complete search history.

(56) References Cited

U.S. PATENT DOCUMENTS

2008/0193821 A1  8/2008  Shimohira et al.
2009/0004527 A1  1/2009  Shimohira et al.
(Continued)

FOREIGN PATENT DOCUMENTS

JP    2008-202039    9/2008
JP    5286797 B2     9/2013
(Continued)

OTHER PUBLICATIONS

International Search Report dated Dec. 12, 2017 in PCT/JP2017/033560 filed Sep. 15, 2017 (with English Translation).

*Primary Examiner* — Victoria H Lynch
(74) *Attorney, Agent, or Firm* — Oblon, McClelland, Maier & Neustadt, L.L.P.

(57) ABSTRACT

To provide a polymer capable of forming a polymer electrolyte membrane that is resistant to breakage even when being repeatedly subjected to humidification and drying or a catalyst layer that is resistant to formation of cracks; a polymer electrolyte membrane employing said polymer; and a membrane/electrode assembly for a polymer electrolyte fuel cell. A polymer comprising units (u1) having two ion-exchange groups and units (u2) of e.g. a perfluoro(alkyl vinyl ether), wherein the molar ratio (u2)/((u1)+(u2)) is more than 0.30 and at most 0.70. A membrane/electrode assembly 10 comprising an anode 13 having a catalyst layer 11 and a gas diffusion layer 12, a cathode 14 having a catalyst layer 11 and a gas diffusion layer 12, and a polymer electrolyte membrane 15 disposed between the anode 13 and the cathode 14 in a state of being contact with the catalyst layers 11, wherein either one or each of the catalyst layers 11 and the polymer electrolyte membrane 15 contains the aforementioned polymer.

14 Claims, 1 Drawing Sheet

(51) Int. Cl.
- *C08F 216/14* (2006.01)
- *H01M 8/1004* (2016.01)
- *C08J 5/22* (2006.01)
- *C08F 216/16* (2006.01)
- *H01M 8/02* (2016.01)
- *C08F 8/12* (2006.01)
- *H01B 1/06* (2006.01)
- *H01M 8/10* (2016.01)
- *H01M 8/1018* (2016.01)

(52) U.S. Cl.
CPC ............... *C08F 216/16* (2013.01); *C08J 5/22* (2013.01); *H01B 1/06* (2013.01); *H01M 8/02* (2013.01); *H01M 8/10* (2013.01); *H01M 8/1004* (2013.01); *H01M 8/1023* (2013.01); *C08F 216/1475* (2020.02); *H01M 2008/1095* (2013.01)

(56) References Cited

U.S. PATENT DOCUMENTS

| | | |
|---|---|---|
| 2015/0030962 A1 | 1/2015 | Hommura et al. |
| 2016/0075804 A1 | 3/2016 | Saito et al. |
| 2017/0288249 A1 | 10/2017 | Hommura et al. |

FOREIGN PATENT DOCUMENTS

| | | |
|---|---|---|
| WO | WO 2008/090990 A1 | 7/2008 |
| WO | WO 2013/157395 | 10/2013 |
| WO | WO 2015/002008 A1 | 1/2015 |
| WO | WO 2016/104380 A1 | 6/2016 |

POLYMER, POLYMER ELECTROLYTE MEMBRANE AND MEMBRANE/ELECTRODE ASSEMBLY

TECHNICAL FIELD

The present invention relates to a polymer, a polymer electrolyte membrane and a membrane/electrode assembly for a polymer electrolyte fuel cell.

BACKGROUND ART

A polymer electrolyte fuel cell has, for example, a structure in which a cell is formed by sandwiching a membrane/electrode assembly for a polymer electrolyte fuel cell between two separators, and a plurality of such cells are stacked. The membrane/electrode assembly for a polymer electrolyte fuel cell comprises an anode and a cathode each having a catalyst layer, and a polymer electrolyte membrane disposed between the anode and the cathode.

In the polymer electrolyte fuel cell, depending upon the operation conditions, humidification and drying are repeated. The polymer electrolyte membrane contains an ion-exchange resin, and thus will be swelled by humidification and will shrink by drying. Therefore, as the polymer electrolyte membrane repeats swelling by humidification and shrinkage by drying, wrinkles are likely to be formed in the polymer electrolyte membrane, and breakage is likely to be caused by formation of such wrinkles. With a view to reducing the resistance of the polymer electrolyte membrane thereby to improve the power generation performance of the polymer electrolyte fuel cell, thinning of the polymer electrolyte membrane is desired, but if the polymer electrolyte membrane is made to be thin, breakage caused by formation of wrinkles becomes remarkable. Therefore, a polymer electrolyte membrane is desired which has higher mechanical resistance even in an environment where humidification and drying are repeated.

Further, the catalyst layer contains a catalyst and an ion exchange resin. Since the catalyst layer contains a large amount of a catalyst, cracking is likely to be caused.

As the ion exchange resin to be contained in the polymer electrolyte membrane or in the catalyst layer, the following (1) is, for example, proposed.

(1) A polymer comprising units (U1) having two ion exchange groups and units (U2) derived from at least one member selected from the group consisting of a perfluoro (alkyl vinyl ether) and a perfluoro(etheric oxygen atom-containing alkyl vinyl ether), wherein the molar ratio (U2)/((U1)+(U2)) of the units (U2) to the total of the units (U1) and the units (U2) is from 0.05 to 0.3 (Patent Document 1).

PRIOR ART DOCUMENT

Patent Document

Patent Document 1: JP-A-2008-202039

DISCLOSURE OF INVENTION

Technical Problem

However, the polymer electrolyte membrane using the polymer of the above (1) is likely to be easily broken by repetition of swelling by humidification and shrinkage by drying, especially when thinned to a thickness of less than 25 μm.

The present invention is to provide a polymer capable of forming a polymer electrolyte membrane which is less likely to be broken even in an environment where humidification and drying are repeated, or a catalyst layer which is less likely to be cracked; a polymer electrolyte membrane which is less likely to be broken even in an environment where humidification and drying are repeated; and a membrane/electrode assembly for a polymer electrolyte fuel cell, whereby breakage of the polymer electrolyte membrane in an environment where humidification and drying are repeated, or cracking of the catalyst layer, is suppressed.

Solution to Problem

The present invention has the following constructions.

[1] A polymer having units represented by the following formula (u1) and units represented by the following formula (u2), wherein the molar ratio (u2)/((u1)+(u2)) of the units represented by the formula (u2) to the total of the units represented by the formula (u1) and the units represented by the formula (u2) is more than 0.30 and at most 0.70,

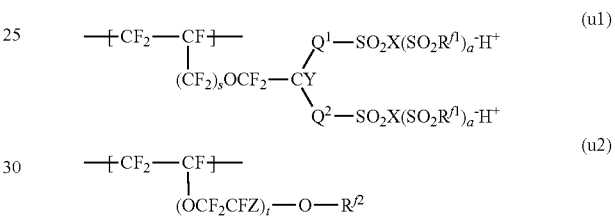

wherein $Q^1$ is a perfluoroalkylene group which may have an etheric oxygen atom, $Q^2$ is a single bond, or a perfluoroalkylene group which may have an etheric oxygen atom, $R^{f1}$ is a perfluoroalkyl group which may have an etheric oxygen atom, X is an oxygen atom, a nitrogen atom or a carbon atom, a is 0 when X is an oxygen atom, 1 when X is a nitrogen atom, or 2 when X is a carbon atom, Y is a fluorine atom or a monovalent perfluoro organic group, s is 0 or 1, $R^{f2}$ is a monovalent perfluoro organic group which does not contain an ion exchange group, Z is a fluorine atom or a monovalent perfluoro organic group, and t is an integer of from 0 to 3.

[2] The polymer according to [1], which further has units derived from tetrafluoroethylene.

[3] The polymer according to [2], wherein the proportion of the units derived from tetrafluoroethylene is from 50 to 90 mol % to the total of all units in the polymer.

[4] The polymer according to any one of [1] to [3], wherein both of $Q^1$ and $Q^2$ in the above formula (u1) are a perfluoroalkylene group having an etheric oxygen atom.

[5] The polymer according to any one of [1] to [4], wherein $R^{f2}$ is a 01-8 monovalent perfluoro organic group.

[6] The polymer according to any one of [1] to [5], of which the equivalent weight is from 400 to 900 g dry resin/equivalent.

[7] The polymer according to any one of [1] to [6], of which the difference between the elastic modulus at 80° C. and at a humidity of 3% RH, and the elastic modulus at 80° C. and at a humidity of 90% RH, is from 2 to 20 MPa.

[8] The polymer according to any one of [1] to [7], of which the conductivity under conditions of a temperature of 80° C. and a humidity of 50% RH, is at least 0.01 S/cm.

[9] The polymer according to any one of [1] to [8], of which the water content is from 10 to 500 mass %.

[10] The polymer according to any one of [1] to [9], of which the storage elastic modulus at a temperature of 80° C., is from 5 to 90 MPa.
[11] A polymer electrolyte membrane comprising the polymer as defined in any one of [1] to [10].
[12] The polymer electrolyte membrane according to [11], of which the thickness is less than 25 μm.
[13] A membrane/electrode assembly for a polymer electrolyte fuel cell, comprising an anode having a catalyst layer, a cathode having a catalyst layer, and a polymer electrolyte membrane disposed between the anode and the cathode, wherein the polymer electrolyte membrane comprises the polymer as defined in any one of [1] to [10].
[14] A membrane/electrode assembly for a polymer electrolyte fuel cell, comprising an anode having a catalyst layer, a cathode having a catalyst layer, and a polymer electrolyte membrane disposed between the anode and the cathode, wherein the catalyst layer of either one or each of the anode and the cathode, comprises the polymer as defined in any one of [1] to [10].
[15] A membrane/electrode assembly for a polymer electrolyte fuel cell, comprising an anode having a catalyst layer, a cathode having a catalyst layer, and a polymer electrolyte membrane disposed between the anode and the cathode, wherein the polymer electrolyte membrane and the catalyst layer of either one or each of the anode and the cathode, comprise the polymer as defined in any one of [1] to [10].

Advantageous Effects of Invention

By using the polymer of the present invention, it is possible to form a polymer electrolyte membrane which is less likely to be broken even in an environment where humidification and drying are repeated, or a catalyst layer which is less likely to be cracked.

The polymer electrolyte membrane of the present invention is less likely to be broken even in an environment where humidification and drying are repeated.

In the membrane/electrode assembly for a polymer electrolyte fuel cell of the present invention, breakage of the polymer electrolyte membrane in an environment where humidification and drying are repeated, or cracking of the catalyst layer, is suppressed.

DESCRIPTION OF EMBODIMENTS

Figure 1:
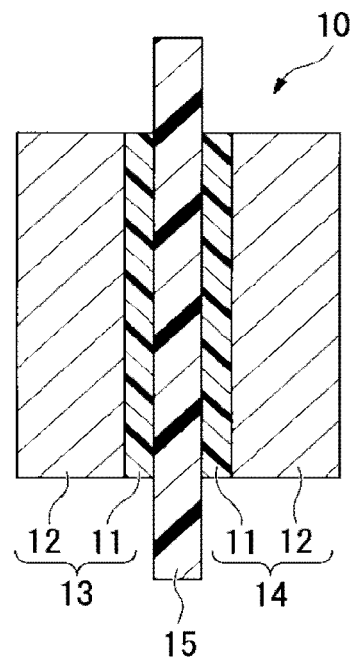
FIG. 1 is a schematic cross-sectional view showing an example of the membrane/electrode assembly for a polymer electrolyte fuel cell of the present invention.

The following definitions of terms and manner of description will apply throughout this specification including claims.

Units represented by the formula (u1) will be referred to as "units (u1)", and a compound represented by the formula (m1) will be referred to as a "compound (m1)". Units and compounds represented by other formulae will be referred to in the same manner.

A "unit" means an atomic group derived from a monomer, formed by polymerization of the monomer (i.e. a "monomer unit"), or an atomic group having a part of said atomic group converted to another structure by treatment of the polymer.

A "perfluoro organic group" means a group containing at least one carbon atom and having all hydrogen atoms covalently bonded to the carbon atom substituted by fluorine atoms.

A "perfluoroalkyl group" means a group having all hydrogen atoms covalently bonded to carbon atoms in an alkyl group substituted by fluorine atoms.

A "perfluoroalkylene group" means a group having all hydrogen atoms covalently bonded to carbon atoms in an alkylene group substituted by fluorine atoms.

An "ion exchange group" means such a group that some of cations contained in said group can be exchanged by other cations, and, for example, a sulfonic acid group, a sulfonimide group or a sulfonmethide group may be mentioned.

The "equivalent weight" means the number of grams (g) of the following polymer (I) per equivalent of ion-exchange group. The equivalent weight will be hereinafter referred to also as EW.

The numerical range represented by "to" indicates a numerical range including the numerical values before and after "to" as the lower limit value and the upper limit value.

[Polymer]

The polymer of the present invention (hereinafter referred to also as polymer (I)) comprises units (u1) and units (u2). Polymer (I) preferably further has units derived from tetrafluoroethylene (hereinafter referred to also as TFE) from the viewpoint of excellent mechanical strength and chemical durability.

Hereinafter, units derived from TFE will be referred to also as TFE units. Also, units derived from a monomer other than TFE may be referred to in a similar manner.

Units (u1) are units represented by the following formula (u1).

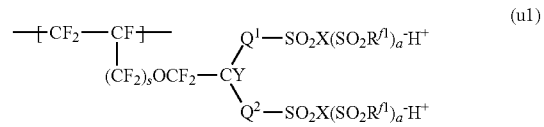

In the formula (u1), the definitions of $Q^1$, $Q^2$, $R^{f1}$, X, a and s are as described above. Here, a single bond means that the carbon atom of CY and the sulfur atom of $SO_2$ are directly bonded.

Here, in a case where the perfluoroalkylene group for $Q^1$ or $Q^2$ has an etheric oxygen atom, the number of such an oxygen atom may be one or may be two or more. Further, such an oxygen atom may be present between carbon atoms of the perfluoroalkylene group or may be present at the CY-side terminal of the perfluoroalkylene group, but is not present at the terminal directly bonded to the sulfur atom.

The perfluoroalkylene group may be linear or branched, and is preferably linear.

The number of carbon atoms in the perfluoroalkylene group is preferably from 1 to 6, more preferably from 1 to 4. When the number of carbon atoms is at most 6, the boiling point of the monomer raw material will be low, whereby the distillation purification will be facilitated. Further, when the number of carbon atoms is at most 6, decrease in the ion exchange capacity of the polymer (I) can be suppressed, and decrease in the proton conductivity can be suppressed.

$Q^2$ is preferably a $C_{1-6}$ perfluoroalkylene group which may have an etheric oxygen atom. When $Q^2$ is a $C_{1-6}$ perfluoroalkylene group which may have an etheric oxygen atom, as compared to a case where $Q^2$ is a single bond, the stability of the power generation performance will be excellent when the polymer electrolyte fuel cell is operated for a long period of time.

It is preferred that both of $Q^1$ and $Q^2$ are a perfluoroalkylene group having an etheric oxygen atom, from the viewpoint of the stability in power generation performance and the mechanical strength of the obtainable membrane.

At least one of $Q^1$ and $Q^2$ is preferably a $C_{1-6}$ perfluoroalkylene group having an etheric oxygen atom, and from the viewpoint of the stability in power generation performance, both of $Q^1$ and $Q^2$ are more preferably a $C_{1-6}$ perfluoroalkylene group having an etheric oxygen atom. A monomer having a $C_{1-6}$ perfluoroalkylene group having an etheric oxygen atom can be prepared without via a fluorination reaction by fluorine gas, whereby the yield is good, and its production is easy.

In a case where $R^{f1}$ has an etheric oxygen atom, the number of such an etheric oxygen atom may be one or may be two or more. Further, such an oxygen atom may be present between carbon atoms of the perfluoroalkyl group, but is not present at the terminal directly bonded to the sulfur atom.

The perfluoroalkyl group for $R^{f1}$ may be linear or branched, and is preferably linear.

The number of carbon atoms in the perfluoroalkyl group is preferably from 1 to 6, more preferably from 1 to 4. As the perfluoroalkyl group, a perfluoromethyl group, a perfluoroethyl group, etc. are preferred.

Two or more $R^{f1}$ in a unit (u1) may, respectively, be the same or different groups.

$-SO_2X(SO_2R^{f1})_a-H^+$ may be $-SO_3^-H^+$, $-SO_2N(SO_2R^{f1})^-H^+$ or $-SO_2C(SO_2R^{f1})_2^-H^+$.

Y is preferably a fluorine atom or a $C_{1-6}$ linear perfluoroalkyl group which may have an etheric oxygen atom.

As the units (u1), from such a viewpoint that it will be easy to produce the polymer (I), and industrial practice will be easy, the following units (u1-1) to (u1-3) are preferred, and from the viewpoint of mechanical strength, the units (u1-2) or units (u1-3) are more preferred.

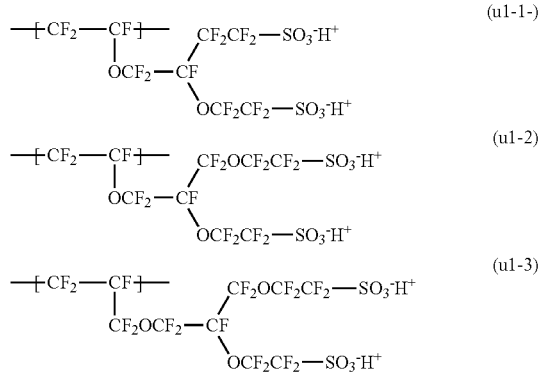

Units (u2) are units represented by the following formula (u2).

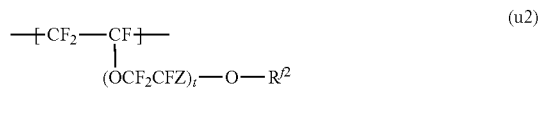

wherein the definitions of $R^{f2}$ and t are as defined above.

Here, $R^{f2}$ is a monovalent perfluoro organic group not containing an ion-exchange group, and the perfluoro organic group for $R^{f2}$ may be linear or branched and is preferably linear.

The number of carbon atoms in the perfluoro organic group is preferably from 1 to 12, more preferably from 1 to 8, further preferably from 1 to 6, particularly preferably from 1 to 4.

The perfluoro organic group for $R^{f2}$ is preferably a perfluoroalkyl group which may contain an etheric oxygen atom. In a case where the perfluoroalkyl group has an etheric oxygen atom, the number of such an oxygen atom may be one or may be two or more. Further, such an oxygen atom may be present between carbon atoms of the perfluoroalkyl group, but is not present at the terminal directly bonded to the oxygen atom.

Z is preferably a fluorine atom or a monovalent perfluoroalkyl group, more preferably a fluorine atom or a trifluoromethyl group.

t is preferably 0 or 1.

As the units (u2), from such a viewpoint that it will be easy to produce the polymer (I) and industrial practice will be easy, the following units (u2-1) to (u2-3) are preferred. From the viewpoint of mechanical strength, the following units (u2-1) to (u2-3) are preferred; units (u2-1) or units (u2-2) are more preferred, and units (u2-1) are further preferred.

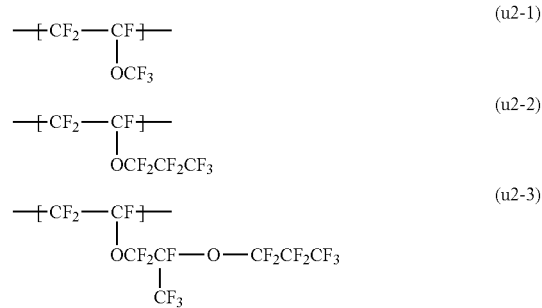

Polymer (I) may further contain units (hereinafter referred to also as "other units") other than the units (u1), the units (u2) and the TFE units. Here, a unit having only one ion-exchange group is one type of said "other units".

Other units are units based on monomers (hereinafter referred to also as "other monomers") other than the monomer (the later-described compound m1) which becomes units (u1), the monomer (the later-described compound m2) which becomes units (u2) and TFE.

Other monomers may, for example, be chlorotrifluoroethylene, trifluoroethylene, vinylidene fluoride, vinyl fluoride, ethylene, propylene, a perfluoro α-olefin (such as hexafluoropropylene), a (perfluoroalkyl)ethylene (such as (perfluorobutyl)ethylene), a (perfluoroalkyl)propene (such as 3-perfluorooctyl-1-propene), compound m3, compound m4, compound m5, etc.

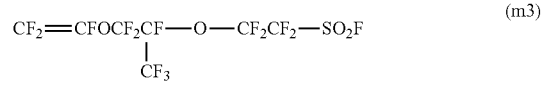

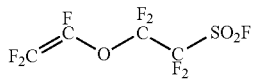
(m4)

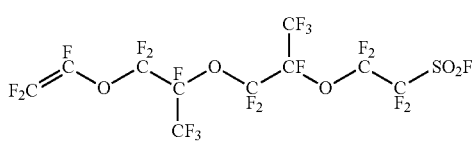
(m5)

The total proportion of the units (u1) and the units (u2) in polymer (I) is, to the total of all units in polymer (I), preferably from 10 to 50 mol %, more preferably from 15 to 40 mol %. When the total proportion of the units (u1) and the units (u2) is within the above range, the ion exchange capacity of polymer (I) can easily be adjusted to the preferred range, and it will be easy to obtain a polymer electrolyte membrane which is less likely to be broken even in an environment where humidification and drying are repeated.

The molar ratio (u2)/((u1)+(u2)) of the units (u2) to the total of the units (u1) and the units (u2) in polymer (I) is preferably more than 0.30 and at most 0.70, more preferably more than 0.30 and at most 0.60. If the molar ratio exceeds 0.70, the ion exchange capacity becomes small, and it becomes difficult to obtain the required conductivity. If the molar ratio is 0.30 or less, the difference in elastic modulus between under humidification (humidity: 90% RH) and under no humidification (humidity: 3% RH) becomes large, whereby breakage of the membrane due to repetition of swelling by humidification and shrinkage by drying is likely to occur.

The (content) proportion of TFE units in polymer (I) is, to the total of all units in polymer (I), preferably from 50 to 90 mol %, more preferably from 60 to 85 mol %. When the proportion is at least the lower limit value in the above range, the mechanical strength and chemical durability of polymer (I) will be further excellent. When the proportion is at most the upper limit value in the above range, it is less likely to impair the effects by the units (u1) and the units (u2).

The proportions of the units (u1)/the units (u2)/the TFE units in polymer (I) are, to the total of all units in polymer (I), preferably 5 to 25/5 to 25/50 to 90 mol %, more preferably 8 to 20/7 to 20/60 to 85 mol %. When the proportions of the respective units are within the above range, the mechanical strength and chemical durability of polymer (I) will be excellent.

The (content) proportion of other units in polymer (I) is, to the total of all units in polymer (I), preferably from 0 to 10 mol %, more preferably from 0 to 8 mol %. When the proportion of other units is within the above range, it is less likely to impair the effects by the units (u1), the unit (u2) and the TFE units.

Polymer (I) may contain the units (u1), the units (u2) and other units, respectively of one type, or respectively of two or more types.

The equivalent weight (EW) of polymer (I) is preferably from 400 to 900 g dry resin/equivalent (hereinafter referred to also as g/equivalent), more preferably from 500 to 800 g/equivalent, further preferably from 550 to 780 g/equivalent, particularly preferably from 580 to 750 g/equivalent. When EW is at most the upper limit value in the above range, the proton conductivity of the polymer electrolyte membrane becomes high (the electrical resistance becomes low), whereby when used as a polymer electrolyte membrane for a polymer electrolyte fuel cell, it is possible to obtain a sufficient cell output. When EW is at least the lower limit value in the above range, the synthesis of a high molecular weight polymer becomes easy, and since polymer (I) does not swell excessively in water, it is possible to maintain the mechanical strength of the polymer electrolyte membrane.

The ion exchange capacity of polymer (I) is preferably from 1.1 to 2.5 meq/g dry resin (hereinafter referred to also as meq/g), more preferably from 1.25 to 2.0 meq/g, further preferably from 1.28 to 1.82 meq/g, particularly preferably from 1.33 to 1.72 meq/g. When the ion exchange capacity is at least the lower limit value in the above range, the conductivity becomes high, whereby it becomes possible to obtain a membrane/electrode assembly for a polymer electrolyte fuel cell which is further excellent in power generation performance. When the ion exchange capacity is at most the upper limit value in the above range, the synthesis of a high molecular weight polymer becomes easy. Further, since polymer (I) does not swell excessively in water, it becomes easy to maintain the mechanical strength.

The conductivity of polymer (I) is, under the conditions of 80° C. and a humidity of 50% RH, preferably at least 0.01 S/cm, more preferably at least 0.02 S/cm, further preferably at least 0.03 S/cm. When said conductivity is at least the lower limit value in the above range, it will be possible to obtain a membrane/electrode assembly for a polymer electrolyte fuel cell which is further excellent in power generation performance. The upper limit value for said conductivity is not particularly limited, but, in practice, is 10 S/cm.

The water content in polymer (I) is preferably from 10 to 500 mass %, more preferably from 15 to 300 mass %. When the water content is at least the lower limit value in the above range, the conductivity becomes high, whereby it will be possible to obtain a membrane/electrode assembly for a polymer electrolyte fuel cell which is further excellent in power generation performance. When the water content is at most the upper limit value in the above range, the polymer (I) does not swell excessively in water, whereby it is possible to maintain the mechanical strength.

The elastic modulus of polymer (I) as measured by the method described later is, in an environment of 80° C. under a humidity of 3% RH (no humidification), preferably at most 42 MPa, more preferably at most 40 MPa, and preferably at least 5 MPa, more preferably at least 10 MPa. Said elastic modulus is preferably from 5 to 42 MPa, more preferably from 10 to 40 MPa. When the elastic modulus is at most the upper limit value, in a case where a polymer electrolyte membrane with a thickness of less than 25 μm, is prepared by using polymer (I), breakage of the membrane due to repetition of swelling by humidification and shrinkage by drying, becomes less likely to occur. When the elastic modulus of polymer (I) is at least the lower limit value, the strength tends to become excellent when made into a polymer electrolyte membrane.

Further, the elastic modulus of polymer (I) as measured by the method described later is, in an environment of 80° C. under a humidity of 90% RH, preferably at most 20 MPa, more preferably at most 18 MPa, and preferably at least 3 MPa, more preferably at least 5 MPa. Said elastic modulus is preferably from 3 to 20 MPa, more preferably from 5 to 18 MPa. When the elastic modulus is at most the upper limit value, in a case where a polymer electrolyte membrane with a thickness of less than 25 μm is prepared by using polymer (I), breakage of the membrane due to repetition of swelling by humidification and shrinkage by drying, becomes less likely to occur. When the elastic modulus is at least the lower limit value, the strength tends to become excellent when made into a polymer electrolyte membrane.

The difference between the elastic modulus at 80° C. under a humidity of 3% RH (no humidity), and the elastic modulus at 80° C. under a humidity of 90% RH, of polymer (I), should better be small. It is preferably at most 20 MPa, more preferably at most 18 MPa, further preferably at most 12 MPa. The difference in the elastic modulus is preferably from 2 to 20 MPa, more preferably from 5 to 18 MPa, further preferably from 2 to 12 MPa. When the difference in the elastic modulus is within the above range, in a case where a polymer electrolyte membrane with a thickness of less than 25 μm is prepared by using polymer (I), breakage of the membrane due to repetition of swelling by humidification and shrinkage by drying becomes less likely to occur.

The storage modulus at 80° C. of polymer (I) (measuring device: dynamic viscoelasticity measuring apparatus, measurement frequency: 1 Hz, heating rate: 2° C./min) is preferably from 5 to 90 MPa, more preferably from 7 to 85 MPa, further preferably from 10 to 80 MPa. When the storage modulus is within the above range, in a case where a polymer electrolyte membrane with a thickness of less than 25 μm is prepared by using polymer (I), breakage due to repetition of swelling by humidification and shrinkage by drying becomes less likely to occur.

(Method for Producing Polymer (I))

Polymer (I) may be produced, for example, by converting —SO$_2$F groups in polymer (F) having the —SO$_2$F groups to ion exchange groups.

Polymer (F) is a precursor of polymer (I), and is a polymer having units (u'1) and units (u2). Polymer (F) preferably further contains TFE units, from such a viewpoint that polymer (I) having excellent mechanical strength and chemical durability will thereby be easily obtainable.

Units (u'1) are units represented by the following formula (u'1).

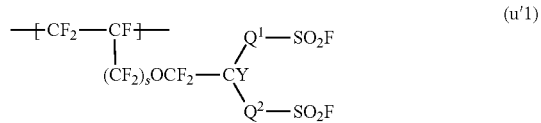

(u'1)

Here, $Q^1$, $Q^2$, Y and s in formula (u'1) are the same as $Q^1$, $Q^2$, Y and s in the units (u1), and the preferred embodiments are also the same.

As the units (u'1), from such a viewpoint that it will be easy to produce polymer (F), and industrial practice will be easy, the following units (u'1-1) to (u'1-3) are preferred, and from the viewpoint of mechanical strength, the following units (u'1-2) or units (u'1-3) are more preferred.

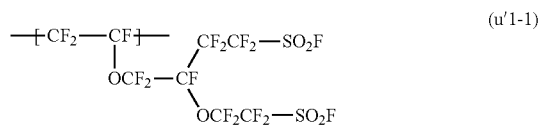

(u'1-1)

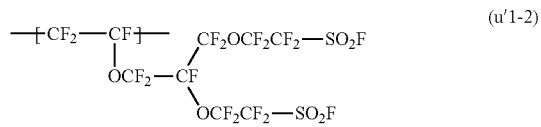

(u'1-2)

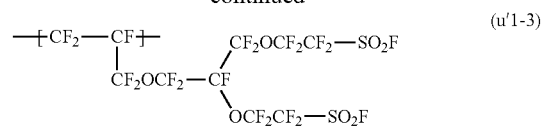

(u'1-3)

Polymer (F) may further have other units derived from other monomers mentioned in polymer (I).

The (content) proportions of the respective units in polymer (F) may suitably be adjusted so that the proportions of the respective units in polymer (I) would be within the above mentioned preferred ranges.

Polymer (F) may have the units (u'1), the units (u2) and other units, respectively of one type, or respectively of two or more types.

The TQ value of polymer (F) is preferably at least 180° C., more preferably from 190 to 300° C., further preferably from 200 to 280° C. When the TQ value is at least the lower limit value in the above range, elongation at break of the polymer electrolyte membrane will be improved. When the TQ value is at most the upper limit value in the above range, moldability of polymer (F) will be further excellent.

Here, the TQ value is, with respect to polymer (F), a temperature at which the extrusion rate from a nozzle having a length of 1 mm and an inner diameter of 1 mm under an extrusion pressure of 2.94 MPa, would be 100 mm$^3$/sec. The higher the TQ value, the larger the molecular weight of the polymer.

As the production method for polymer (F), a known method may be employed, and, for example, a method of polymerizing a monomer component comprising either one or both of compound (m1) and compound (m2), and optionally either one or both of TFE and other monomers.

Compound (m1) is a compound represented by the following formula (m1).

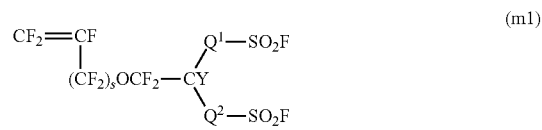

(m1)

Here, in the formula (m1), $Q^1$, $Q^2$, Y and s are the same as $Q^1$, $Q^2$, Y and s in the units (u1), and the preferred embodiments are also the same.

As compound (m1), compounds (m1-1) to (m1-3) are preferred, and from the viewpoint of mechanical strength, compound (m1-2) or compound (m1-3) is more preferred.

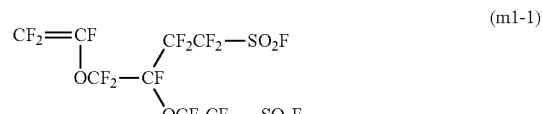

(m1-1)

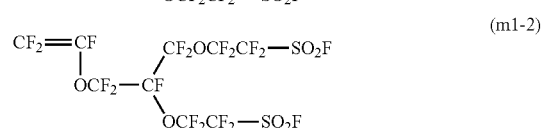

(m1-2)

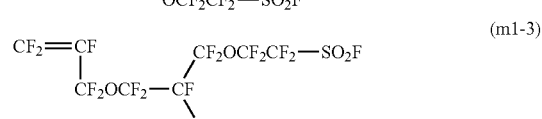

(m1-3)

Compound (m1) can be prepared, for example, by a known synthetic method such as a method described in [0053] to [0054] in WO2007/013533.

Compound (m2) is a compound represented by the following formula (m2).

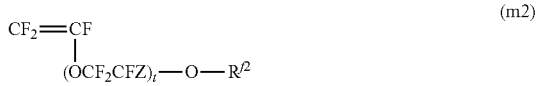

Here, in the formula (m2), $R^{f2}$, Z and t are the same as $R^{f2}$, Z and t in the units (u2), and the preferred embodiments are also the same.

As compound (m2), compounds (m2-1) to (m2-3) are preferred. From the viewpoint of mechanical strength, the following compounds (m2-1) to (m2-3) are preferred; compound (m2-1) or compound (m2-2) is more preferred; and compound (m2-1) is further preferred.

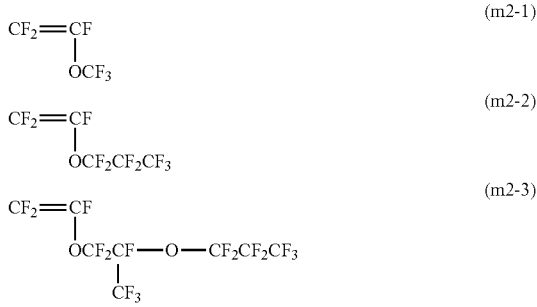

Compound (m2) can be produced, for example, by a known synthetic method such as a method described in the Examples in U.S. Pat. No. 3,291,843.

As the polymerization method, for example, a method described in [0046] to [0051] in WO2007/013533, a method described in [0050] to [0056] in WO2008/090990, etc., may be mentioned.

As the method for converting —$SO_2F$ groups in polymer (F) to ion-exchange groups, it is possible to employ, for example, a known method such as a method described in [0057] to [0059] in WO2008/090990.

Further, polymer (I) wherein ion-exchange groups are sulfonimide groups may be produced also by polymerizing a compound having —$SO_2F$ groups in compound (m1) converted to sulfonimide groups, with the compound (m2), and optionally with TFE and other monomers.

The polymer of the present invention as described above, has units (u1) and units (u2), wherein the molar ratio (u2)/((u1)+(u2)) is more than 0.30 and at most 0.70. Thus, the difference between the elastic modulus during humidification (humidity: 90% RH) and the elastic modulus during non-humidification (humidity: 3% RH), of polymer (I) becomes small, whereby, at the time of forming a polymer electrolyte membrane, breakage is unlikely to occur even if swelling by humidification and shrinkage by drying are repeated, and at the time of forming a catalyst layer, cracking is unlikely to occur.

[Polymer Electrolyte Membrane]

The polymer electrolyte membrane of the present invention is a membrane comprising polymer (I).

The membrane thickness of the polymer electrolyte membrane of the present invention is preferably less than 25 μm, more preferably from 1 to 20 μm, further preferably from 1 to 15 μm, particularly preferably from 1 to 10 μm. When the membrane thickness is less than 25 μm, a membrane/electrode assembly for a polymer electrolyte fuel cell excellent in power generation performance can be easily obtained. When the membrane thickness is at least the lower limit value in the above range, wrinkles will be less likely to be formed in the polymer electrolyte membrane, and breakage will be less likely to occur.

The polymer electrolyte membrane may be reinforced by a reinforcing material. The reinforcing material may be a porous body, fibers, woven fabric, nonwoven fabric, etc. As the material for the reinforcing material, polytetrafluoroethylene, a TFE-hexafluoropropylene copolymer, a TFE-perfluoro(alkyl vinyl ether) copolymer, polyethylene, polypropylene, polyphenylene sulfide, etc. may be mentioned.

The polymer electrolyte membrane may, in order to further improve the durability, contain at least one type of atoms selected from the group consisting of cerium and manganese. Cerium or manganese will decompose hydrogen peroxide which is an agent that causes deterioration of the polymer electrolyte membrane. Cerium or manganese is preferably present in the form of ions in the polymer electrolyte membrane, and so long as it is present in the form of ions, it may be present in any state in the polymer electrolyte membrane.

As the method for producing the polymer electrolyte membrane, for example, a method (a casting method) may be mentioned, which comprises applying a liquid composition comprising polymer (I) and a liquid medium and having the polymer (I) dispersed in the liquid medium, on a substrate film or a catalyst layer, followed by drying.

As the liquid medium, from such a viewpoint that dispersibility of polymer (I) will be good, one containing a hydrocarbon alcohol is preferred, and a mixed solvent of a hydrocarbon alcohol and water is more preferred. As the hydrocarbon alcohol, methanol, ethanol, 1-propanol, 2-propanol, 1-butanol, etc. may be mentioned. As the hydrocarbon alcohol, one type may be used alone, or two or more types may be used as mixed.

The proportion of the hydrocarbon alcohol in the liquid medium is preferably from 5 to 95 mass %, more preferably from 15 to 85 mass %.

The proportion of polymer (I) in the liquid medium is preferably from 1 to 50 mass %, more preferably from 3 to 30 mass %.

The process for preparing the liquid composition may, for example, be a method of exerting shearing such as stirring to polymer (I) in the liquid medium under atmospheric pressure or in a state closed in e.g. an autoclave. As the case requires, shearing of e.g. ultrasonic waves may be imparted. The temperature at the time of preparation of the liquid composition is preferably from 50 to 180° C., more preferably from 80 to 130° C. The time is preferably from 1 to 48 hours, more preferably from 2 to 24 hours.

After drying, in order to stabilize the polymer electrolyte membrane, it is preferred to conduct annealing treatment. The temperature for the annealing treatment is preferably from 120 to 200° C. When the annealing temperature is at least 120° C., polymer (I) will not be excessively hydrated. When the annealing temperature is at most 200° C., it is possible to suppress thermal decomposition of ion exchange groups.

The polymer electrolyte membrane of the present invention as described above, is unlikely to be broken even in an environment where humidification and drying are repeated. Further, the polymer electrolyte membrane of the present invention can be made to be a thin membrane having a thickness of less than 25 µm, whereby it is possible to improve the power generation performance of the polymer electrolyte fuel cell. Further, the polymer electrolyte membrane of the present invention is able to secure a sufficient conductivity by thinning, even with a small amount of ion-exchange groups which polymer (I) has.

[Membrane/Electrode Assembly for Polymer Electrolyte Fuel Cell]

The membrane/electrode assembly for a polymer electrolyte fuel cell (hereinafter referred to also as the membrane/electrode assembly) of the present invention is a membrane/electrode assembly comprising an anode having a catalyst layer, a cathode having a catalyst layer and a polymer electrolyte membrane disposed between the anode and the cathode. In the membrane/electrode assembly, either one or both of the catalyst layers and the polymer electrolyte membrane comprise polymer (I). In the membrane/electrode assembly, it is preferred that both of the catalyst layers and the polymer electrolyte membrane comprise polymer (I).

FIG. 1 is a schematic cross-sectional view showing one example of the membrane/electrode assembly of the present invention. The membrane/electrode assembly 10 comprises an anode 13 having a catalyst layer 11 and gas diffusion layer 12, a cathode 14 having a catalyst layer 11 and gas diffusion layer 12, and a polymer electrolyte membrane 15 disposed between the anode 13 and the cathode 14, in a state in contact with the catalyst layers 11.

The catalyst layer is a layer containing a catalyst and an ion exchange resin.

As the catalyst, a supported catalyst having platinum or a platinum alloy supported on a carbon support may be mentioned.

As the carbon support, carbon black powder, graphitized carbon, carbon fibers, carbon nanotubes, etc. may be mentioned.

As the ion-exchange resin, a known ion-exchange resin to be used for a catalyst layer, may be mentioned, and polymer (I) is preferred from such a viewpoint that it is thereby possible to form a catalyst layer which is less susceptible to cracking.

The gas diffusion layer has a function to uniformly diffuse a gas into the catalyst layer and a function as a current collector. As the gas diffusion layer, carbon paper, carbon cloth, carbon felt, etc. may be mentioned. The gas diffusion layer is preferably one treated for water repellency by e.g. polytetrafluoroethylene.

Figure 2:
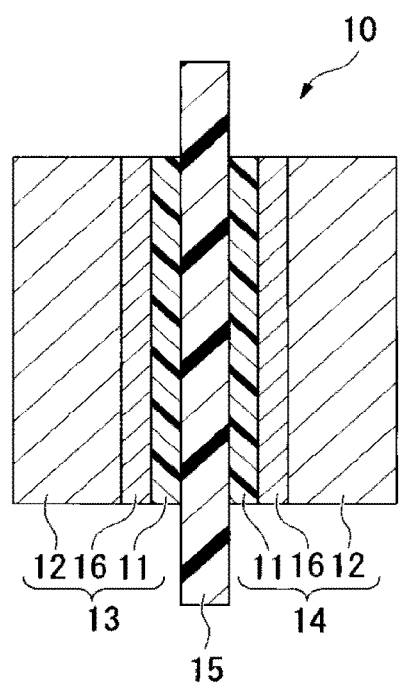
FIG. 2 is a schematic cross-sectional view showing another example of the membrane/electrode assembly for a polymer electrolyte fuel cell of the present invention.

As shown in FIG. 2, the membrane electrode assembly 10 may have a carbon layer 16 between the catalyst layer 11 and the gas diffusion layer 12.

By disposing the carbon layer, the gas diffusion property of the surface of the catalyst layer will be improved, and the power generation performance of the polymer electrolyte fuel cell will be substantially improved.

The carbon layer is a layer containing carbon and a nonionic fluorinated polymer.

As the carbon, carbon particles, carbon fibers, etc. may be mentioned, and carbon nanofibers having a fiber diameter of from 1 to 1,000 nm and a fiber length of at most 1,000 µm are preferred.

As the nonionic fluorinated polymer, polytetrafluoroethylene, etc. may be mentioned.

The polymer electrolyte membrane is a membrane containing an ion-exchange resin.

As the ion-exchange resin, a known ion-exchange resin to be used for a polymer electrolyte membrane may be mentioned, and polymer (I) is preferred from such a viewpoint that wrinkles will be unlikely to be formed, breakage will be unlikely to occur, and it is possible to form a thin polymer electrolyte membrane.

The polymer electrolyte membrane may be reinforced by a reinforcing material.

The polymer electrolyte membrane may, in order to further improve the durability, further contain at least one type of atoms selected from the group consisting of cerium and manganese.

In a case where the membrane/electrode assembly does not have a carbon layer, the membrane/electrode assembly may be produced, for example, by the following methods.

A method of forming catalyst layers on a polymer electrolyte membrane to form a membrane/catalyst layer assembly, and sandwiching the membrane/catalyst layer assembly by gas diffusion layers.

A method of forming a catalyst layer on a gas diffusion layer to form an electrode (anode, cathode), and sandwiching a polymer electrolyte membrane by the electrodes.

In a case where the membrane/electrode assembly has carbon layers, the membrane/electrode assembly may be produced, for example, by the following methods.

A method of applying a dispersion containing carbon and a nonionic fluorinated polymer on a substrate film, followed by drying to form a carbon layer, forming a catalyst layer on the carbon layer, bonding the catalyst layer and a polymer electrolyte membrane, peeling the substrate film to obtain a membrane/catalyst layer assembly having carbon layers, and sandwiching the membrane/catalyst layer assembly by gas diffusion layers.

A method of applying a dispersion containing carbon and a nonionic fluorinated polymer on a gas diffusion layer, followed by drying to form a carbon layer, sandwiching a membrane/catalyst layer assembly having catalyst layers formed on a polymer electrolyte membrane, by the gas diffusion layers having carbon layers.

As the method for forming a catalyst layer, the following methods may be mentioned.

A method of applying a catalyst layer-forming coating liquid on a polymer electrolyte membrane, a gas diffusion layer or a carbon layer, followed by drying.

A method of applying a catalyst layer-forming coating liquid on a substrate film, followed by drying to form a catalyst layer, and transferring the catalyst layer onto a polymer electrolyte membrane.

The catalyst layer-forming coating liquid is a liquid having an ion exchange resin and a catalyst dispersed in a liquid medium. The catalyst layer-forming coating liquid may be formed, for example, by mixing the liquid composition of the present invention and a dispersion of a catalyst.

In the membrane/electrode assembly of the present invention as described above, by incorporating polymer (I) in a polymer electrolyte membrane, it is possible to prevent breakage from occurring in the polymer electrolyte membrane even in an environment where humidification and drying are repeated. Further, by incorporating polymer (I) in a catalyst layer, it is possible to prevent cracking from occurring in the catalyst layer.

[Polymer Electrolyte Fuel Cell]

The polymer electrolyte fuel cell is one provided with the membrane/electrode assembly of the present invention. By disposing a separator having grooves as gas passage, on each side of the membrane/electrode assembly, a polymer electrolyte fuel cell can be obtained.

As the separator, a separator made of a various conductive material, such as a metal separator, a carbon separator, or a separator made of a material obtained by mixing graphite and a resin, may be mentioned.

In the polymer electrolyte fuel cell, power generation is conducted by supplying a gas containing oxygen to the cathode, and a gas containing hydrogen to the anode. Further, the membrane/electrode assembly of the present invention may be applied also to a methanol fuel cell wherein power generation is conducted by supplying methanol to the anode.

EXAMPLES

Hereinafter, the present invention will be specifically described with reference to Examples, but the present invention is not limited by the following description. Here, Ex. 1 to 6 and 12 to 14 are Examples of the present invention, and Ex. 7 to 11, 15 and 16 are Comparative Examples.
(TQ Value)
Using Flow Tester CFT-500A (manufactured by Shimadzu Corporation) provided with a nozzle having a length of 1 mm and an inner diameter of 1 mm, by changing the temperature under a condition of the extrusion pressure of 2.94 MPa, the temperature (TQ value) at which the extrusion amount of polymer (F) became to be 100 mm$^3$/sec was obtained. The higher the TQ value, the larger the molecular weight of the polymer.
(Proportions of the Respective Units)
The proportions of the respective units in polymer (F) were obtained from the measured results by $^{19}$F-NMR.
(Ion Exchange Capacity (AR))
Using polymer (F) obtained in each Ex., the proportions of the respective units were obtained by $^{19}$F-NMR, and the ion exchange capacity was calculated from the composition ratio.
(Equivalent Weight)
The equivalent weight (EW) of polymer (I) was obtained from the following formula (1). As AR, the value obtained by using the above polymer (F) was used.

$$EW=1000/AR \quad (1)$$

(Elastic Modulus)
The membrane of polymer (I) obtained in each Ex. was punched into the shape of No. 7 dumbbell defined by JISK6251 to obtain a test specimen. With respect to the test specimen, in an environment at a temperature of 80° C. under a humidity of 3% RH (no humidification), a tensile test was conducted under a condition of 60 mm/min. to measure the elastic modulus. As the testing machine, RTE-1210 (product name: universal testing machine (Tensilon), manufactured by ORIENTEC CORPORATION)) was used.

Further, also in an environment at a temperature of 80° C. under a humidity of 90% RH, the elastic modulus was measured in the same manner. The difference between the elastic modulus in an environment of a humidity of 3% RH and the elastic modulus in an environment of a humidity of 90% RH, is shown in Table 1.
(Conductivity)
A substrate having four terminal electrodes disposed at 5 mm intervals, was brought in close contact with a measurement sample (width: 5 mm, length: 25 mm) of polymer (I) obtained in each Ex., and by a known four terminal method, under constant temperature and humidity conditions at a temperature of 80° C. under a humidity of 50% RH and 20% RH, the resistance of the polymer electrolyte membrane was measured at an alternating current of 10 kHz and at a voltage of 1 V, whereupon the conductivity was calculated.

(Water Content)
After heating polymer (F) obtained in each Ex. to a temperature at which the polymer (F) flows, it was processed into a film having a thickness of from 100 to 200 µm by press molding. By immersing the film in an aqueous solution containing 15 mass % of methanol and 10 mass % of potassium hydroxide at 80° C. for 16 hours, to hydrolyze —SO$_2$F groups of polymer (F) in the film to convert them to —SO$_3$K groups. The film was immersed for 2 hours in a 3 mol/L aqueous hydrochloric acid solution. By replacing the aqueous hydrochloric acid solution, the same treatment was repeated four more times, to convert —SO$_3$K groups of the polymer in the film to sulfonic acid groups, and the film was thoroughly washed with ultrapure water.

After immersing the film washed with water, in hot water of 80° C. for 16 hours, the film was cooled together with the hot water to room temperature. The film was taken out from water; water attached to the surface was wiped off; and immediately, the mass W1 of the film when being hydrated, was measured. The film was put in a glove box and left to stand for at least 24 hours in an atmosphere where dry nitrogen was permitted to flow, to dry the film. The dried mass W2 of the film in the glove box was measured. The water content was obtained from the following formula (2).

$$\text{Water content (\%)}=(W1-W2)/W2\times100 \quad (2)$$

(Storage Elastic Modulus)
With respect to a measurement sample (width: 5.0 mm, length: 30 mm) of polymer (I) obtained in each Ex., the change due to the temperature of the dynamic viscoelasticity was measured by a dynamic viscoelasticity measuring device by setting, as a tensile measurement mode, a measuring mode at a measurement frequency of 1 Hz and at a temperature-raising rate of 2° C./min. By reading the value of the storage elastic modulus at 80° C. from the obtained temperature dependence of the storage elastic modulus, the storage elastic modulus at 80° C. was obtained.
(Power Generation Performance)
The membrane/electrode assembly obtained in each Ex. was assembled into a power generation cell, and while maintaining the temperature of the membrane/electrode assembly to be at 95° C., hydrogen was supplied to the anode (utilization 70%), and oxygen was supplied to the cathode (utilization 50%), respectively, under a pressure of 151 kPa (absolute pressure). The humidification of the gas was a humidity of 20% RH with respect to each of the hydrogen and the oxygen, and as the power generation performance, the current density at the time when the cell voltage was 0.6 V was recorded. The current density should better be higher, since it is thereby possible to increase the power density in the fuel cell.
(Wet-Dry Cycle Test)
The wet-dry cycle test was conducted by the following method in accordance with a method disclosed by Yeh-Hung Lai, Cortney K. Mittelsteadt, Craig S. Gittleman, David A. Dillard, "VISCOELASTIC STRESS MODEL AND MECHANICAL CHARACTERIZATION OF PERFLUOROSULFONIC ACID (PFSA) POLYMER ELECTROLYTE MEMBRANES", Proceedings of FUEL CELL 2005, Third International Conference on Fuel Cell Science, Engineering and Technology, FUEL CELL 2005, (2005), 74120.

A membrane/electrode assembly using the membrane obtained in each Ex. was assembled into a cell for power generation (electrode area: 25 cm$^2$), and at a cell temperature of 80° C., nitrogen gas was supplied to each of the anode and the cathode at a rate of 1 L/min. By setting a step of supplying nitrogen gas with a humidity of 150% RH for 2 minutes, followed by supplying nitrogen gas with a humidity 0% RH for 2 minutes, as 1 cycle, such a step was repeated. After every 1,000 cycles, the supply of nitrogen gas was stopped, and hydrogen was supplied to the anode and pressurized to cause a pressure difference between the anode and the cathode, whereby the amount of leakage of the hydrogen gas from the anode to the cathode through the membrane/electrode assembly, was measured. The number of cycles was measured to the time point when leakage of hydrogen gas was caused, and at the same time, the crossover rate represented by the leaked amount per unit area per unit time of the hydrogen gas became 5 times the initial value. A case where the number of cycles at said time point was at least 20,000 cycles, was regarded as "○", and a case where it was less than 20,000 cycles, was regarded as "x".

Here, the crossover rate is an index indicating the degree of defects such as pinholes and thinning of the electrolyte membrane.

Abbreviations

TFE: tetrafluoroethylene ($CF_2$=$CF_2$),
P2SVE: compound (m1-2), PMVE: compound (m2-1),
PPVE: compound (m2-2), PHVE: compound (m2-3),
PDVE-5E: compound (m2-4), PSVE: compound (m3),
AC2000: $C_6F_{13}H$ (manufactured by Asahi Glass Company, Limited, registered trademark, ASAHIKLIN AC-2000),
AE3000: $CF_3CH_2OCF_2CF_2H$ (manufactured by Asahi Glass Company, Limited, registered trademark, ASAHIKLIN AE-3000),
AK225G: $CClF_2CF_2CHClF$ (manufactured by Asahi Glass Company, Limited, registered trademark, ASAHIKLIN AK-225G),
AK-141b: $CH_3CCl_2F$,
IPP: diisopropyl peroxydicarbonate (manufactured by NOF CORPORATION, trade name, Peroyl IPP),
AIBN: 2,2'-azobis(isobutyronitrile),
V601: 2,2'-azobis(dimethyl isobutyrate) (manufactured by Wako Pure Chemical Industries, Ltd., V-601)
Units (u'1-2): units derived from compound (m1-2),
Units (u'2-1): units derived from compound (m2-1),
Units (u'2-2): units derived from compound (m2-2),
Units (u'2-3): units derived from compound (m2-3),
Units (u'2-4): units derived from compound (m2-4),
Units (u'3): units derived from compound (m3).

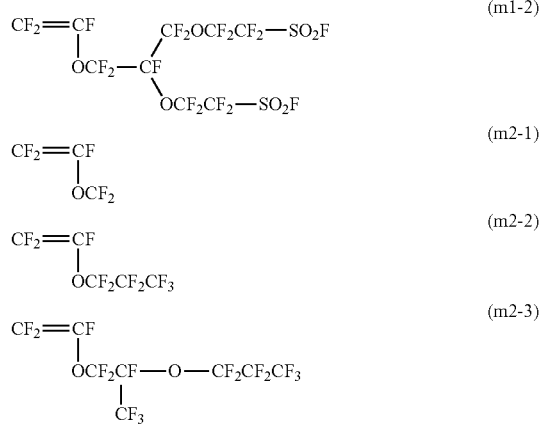

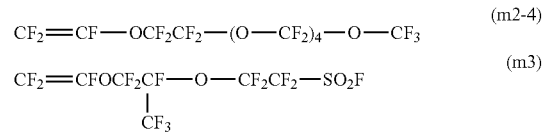

Ex. 1

Production of Polymer (F-1):

Into a stainless steel autoclave with an internal capacity of 1,006 mL, 500.42 g of P2SVE was charged and degassed under reduced pressure at room temperature. While maintaining the reduced pressure and cooling with liquid nitrogen, 97.1 g of PMVE and 199 g of AC2000 were charged. After heating to 40° C., TFE was introduced until the pressure became 1.095 MPaG. After confirming that the pressure did not change, from an addition line attached to the autoclave, 2.0 g of an AC2000 solution having 322.6 mg of IPP dissolved therein was added under pressure by nitrogen gas, and then, 8.0 g of AC2000 was added to wash the addition line. While maintaining the temperature and pressure to be constant, TFE was continuously supplied and polymerized. After 6 hours from initiation of the polymerization, the autoclave was cooled to stop the polymerization reaction, and the gas in the system was purged to obtain a solution of polymer (F-1).

To the solution of polymer (F-1), 810 g of AC2000 was added and mixed. The temperature of the polymer solution was 25° C. This polymer solution was added to 5,200 g of AE3000 at room temperature to coagulate polymer (F-1) to form particles. The liquid containing particles of polymer (F-1) was filtered. To the obtained particles of polymer (F-1), 500 g of AE3000 was added, stirred and then filtered for washing. The washing operation was repeated twice. The obtained particles of polymer (F-1) were dried under reduced pressure at 140° C. for 16 hours to obtain 118.6 g of polymer (F-1).

The composition and the TQ value of polymer (F-1) are shown in Table 1.

Similarly, with respect to the following Ex., the composition and the TQ value of polymer (F) are shown in Table 1.

Using a pressing machine (manufactured by TESTER SANGYO CO., LTD., SA-301), the obtained polymer (F-1) was pressed at the same temperature as the TQ value, to obtain a membrane of polymer (F-1) with size: 30 mm×50 mm, thickness: 100 to 200 μm. The membrane was immersed for 16 hours in an aqueous solution containing 15 mass % of methanol and 10 mass % of potassium hydroxide, to hydrolyze —$SO_2F$ groups in the membrane to convert them to —$SO_3K$ groups. Then, the membrane was immersed for 2 hours in a 3 mol/L hydrochloric acid aqueous solution. By replacing the hydrochloric acid aqueous solution, the same treatment was further repeated four times, followed finally by thorough washing with ultrapure water, to obtain a membrane of polymer (I-1) having —$SO_3K^+$ groups in the membrane converted to sulfonic acid groups (—$SO_3H^+$ groups).

Ex. 2

Production of Polymer (F-2):

Into a stainless steel autoclave with an internal capacity of 1,006 mL, 590.48 g of P2SVE was charged and degassed under reduced pressure at room temperature. After charging 16.24 g of AC2000 under reduced pressure, 206.94 g of PMVE was charged while cooling the autoclave with liquid nitrogen. After heating to 40° C., TFE was introduced until the pressure became 0.80 MPaG. After confirming that the pressure did not change, from the addition line attached to the autoclave, 2.25 g of an AC2000 solution having 246.9 mg of IPP dissolved therein was added under pressure by nitrogen gas, and then, 8.0 g of AC2000 was added to wash the addition line. While maintaining the temperature and pressure to be constant, TFE was continuously supplied and polymerized. After 9.5 hours from initiation of the polymerization, the autoclave was cooled to stop the polymerization reaction, and the gas in the system was purged to obtain a solution of polymer (F-2).

To the solution of polymer (F-2), 370 g of AC2000 was added and mixed. The temperature of the polymer solution was 25° C. This polymer solution was added to 1,730 g of AE3000 at −20° C. to coagulate polymer (F-2), to form particles. The liquid containing particles of polymer (F-2) was filtered. The obtained particles of polymer (F-2) were washed and dried in the same manner as Ex. 1, to obtain 51.8 g of polymer (F-2).

In the same manner as in Ex. 1 except that polymer (F-2) was used instead of polymer (F-1), a membrane of polymer (I-2) having —SO$_2$F groups in the membrane of polymer (F-2) converted to sulfonic acid groups, was obtained.

Ex. 3

Production of Polymer (F-3):

Into a stainless steel autoclave with an internal capacity of 1,006 mL, 471.4 g of P2SVE was charged and degassed under reduced pressure at room temperature. While maintaining reduced pressure, and cooling with liquid nitrogen, 203.77 g of PMVE was charged. After heating to 40° C., TFE was introduced until the pressure became 0.80 MPaG. After confirming that the pressure did not change, from an addition line attached to the autoclave, 2.0 g of an AC2000 solution having 135.6 mg of IPP dissolved therein was added under pressure by nitrogen gas, and then, 4.0 g of AC2000 was added to wash the addition line. While maintaining the temperature and pressure to be constant, TFE was continuously supplied and polymerized. After 25 hours from initiation of the polymerization, the autoclave was cooled to stop the polymerization reaction, and the gas in the system was purged to obtain a solution of polymer (F-3).

To the solution of polymer (F-3), 367 g of AC2000 was added and mixed. The temperature of the polymer solution was 25° C. This polymer solution was added to 1,145 g of AE3000 at −16° C. to coagulate polymer (F-3), to form particles. The liquid containing particles of polymer (F-3) was filtered. The obtained particles of polymer (F-3) were washed and dried as in Ex. 1 to obtain 55.8 g of polymer (F-3).

In the same manner as in Ex. 1 except that polymer (F-3) was used instead of polymer (F-1), a membrane of polymer (I-3) having —SO$_2$F groups in the membrane of polymer (F-3) converted to sulfonic acid groups, was obtained.

Ex. 4

Into a stainless steel autoclave with an internal capacity of 1,006 mL, 573.11 g of P2SVE was charged and degassed at room temperature. While cooling with ice water, 205.58 g of PPVE was charged under reduced pressure. After heating to 40° C., TFE was introduced until the pressure became 0.42 MPaG. After confirming that the pressure did not change, from an addition line attached to the autoclave, 3 g of an AC2000 solution having 317.7 mg of IPP dissolved therein, was added under pressure by nitrogen gas, and then, 12.0 g of AC2000 was added to wash the addition line. While maintaining the temperature and pressure to be constant, TFE was continuously added and polymerized. After 12 hours from initiation of the polymerization, the autoclave was cooled to stop the polymerization reaction, and the gas in the system was purged to obtain a solution of polymer (F-4).

To the solution of polymer (F-4), 300 g of AC2000 was added and mixed. The temperature of the polymer solution was 25° C. This polymer solution was added to 1,516 g of AE3000 at room temperature to coagulate and precipitate polymer (F-4), and then, the liquid phase was removed by decantation, and 1,065 g of AE3000 was added to form particles. The liquid containing particles of polymer (F-4) was filtered. The obtained particles of polymer (F-4) were washed and dried in the same manner as Ex. 1 to obtain 79.9 g of polymer (F-4).

In the same manner as in Ex. 1 except that polymer (F-4) was used instead of polymer (F-1), a membrane of polymer (I-4) having —SO$_2$F groups in the membrane of polymer (F-4) converted to sulfonic acid groups, was obtained.

Ex. 5

Into a stainless steel autoclave with an internal capacity of 1,006 mL, 563.16 g of P2SVE was charged and degassed at room temperature. While cooling with ice water, 153.1 g of PPVE was charged under reduced pressure. After heating to 57° C., TFE was introduced until the pressure became 0.815 MPaG. After confirming that the pressure did not change, from an addition line attached to the autoclave, 5 g of an AC2000 solution having 294.6 mg of V601 dissolved therein was added under pressure by nitrogen gas, and then, 15.0 g of AC2000 was added to wash the addition line. While maintaining the temperature and pressure to be constant, TFE was continuously supplied and polymerized. After 9 hours from initiation of the polymerization, the autoclave was cooled to stop the polymerization reaction, and the gas in the system was purged to obtain a solution of polymer (F-5).

To the solution of polymer (F-5), 487 g of AC2000 was added and mixed. The temperature of the polymer solution was 25° C. This polymer solution was added to 2,007 g of AE3000 at room temperature to coagulate polymer (F-5), to form particles. The liquid containing particles of polymer (F-5) was filtered. The obtained particles of polymer (F-5) were washed and dried as in Ex. 1 to obtain 92.2 g of polymer (F-5).

In the same manner as in Ex. 1 except that polymer (F-5) was used instead of polymer (F-1), a membrane of polymer (I-5) having —SO$_2$F groups in the membrane of polymer (F-5) converted to sulfonic acid groups, was obtained.

Ex. 6

Into a stainless steel autoclave with an internal capacity of 230 mL, 129.46 g of P2SVE, 54.79 g of PHVE, and 1.04 g of an AK225G solution having 37.2 mg of IPP dissolved therein, were charged and freeze-deaerated by liquid nitrogen. After heating to 40° C., TFE was introduced until the pressure became 0.45 MPaG, and then, while maintaining the temperature and pressure to be constant, TFE was continuously supplied and polymerized. After 8.5 hours from initiation of the polymerization, the autoclave was cooled to stop the polymerization reaction, and the gas in the system was purged to obtain a solution of polymer (F-6).

To the solution of polymer (F-6), 30 g of AC2000 was added and mixed. The temperature of the polymer solution was 25° C. This polymer solution was added to 350 g of AK-141b at room temperature to coagulate polymer (F-6), to form particles. The liquid containing particles of polymer (F-6) was filtered. To the obtained particles of polymer (F-6), 200 g of AK-141b was added, stirred and then filtered. The obtained particles of polymer (F-6) were dried under reduced pressure for 16 hours at 140° C. to obtain 15.0 g of polymer (F-6).

In the same manner as in Ex. 1 except that polymer (F-6) was used instead of polymer (F-1), a membrane of polymer (I-6) having —$SO_2F$ groups in the membrane of polymer (F-6) converted to sulfonic acid groups, was obtained.

Ex. 7

Production of Polymer (F-7):

Into a stainless steel autoclave with an internal capacity of 230 mL, 95.14 g of P2SVE, and 1.5 g of AC2000 having 52.8 mg of IPP dissolved therein, were charged and freeze-deaerated by liquid nitrogen. Then, while cooling with liquid nitrogen, 74.1 g of PMVE was charged. After heating to 40° C., TFE was introduced until the pressure became 0.94 MPaG. While maintaining the temperature and pressure to be constant, TFE was continuously supplied and polymerized. After 10 hours from initiation of the polymerization, the autoclave was cooled to stop the polymerization reaction, and the gas in the system was purged to obtain a solution of polymer (F-7).

To the solution of polymer (F-7), 120 g of AC2000 was added and mixed. The temperature of the polymer solution was 25° C. This polymer solution was added to 300 g of AE3000 at −20° C. to coagulate polymer (F-7), to form particles. The liquid containing particles of polymer (F-7) was filtered. To the obtained particles of polymer (F-7), 200 g of AE3000 was added, stirred and then filtered for washing. The washing operation was repeated twice. The obtained particles of polymer (F-7) were dried under reduced pressure for 16 hours at 140° C. to obtain 8.3 g of polymer (F-7).

In the same manner as in Ex. 2 except that polymer (F-7) was used instead of polymer (F-1), a membrane of polymer (I-7) having —$SO_2F$ groups in the membrane of polymer (F-7) converted to sulfonic acid groups, was obtained.

Ex. 8

Into a stainless steel autoclave with an internal capacity of 230 mL, 150.02 g of P2SVE and 6.5 g of AK225G were charged and freeze-deaerated by liquid nitrogen. Under reduced pressure while cooling the autoclave by liquid nitrogen, 12.01 g of PMVE was charged. After heating to 65° C., TFE was introduced until the pressure became 1.53 MPaG. After confirming that the pressure did not change, from an addition line attached to the autoclave, 2.05 g of an AK225G solution having 52.1 mg of AIBN dissolved therein, was added under pressure by nitrogen gas, and then, 4.0 g of AK225G was added to wash the addition line. While maintaining the temperature and pressure to be constant, TFE was continuously supplied and polymerized. After 4.0 hours from initiation of the polymerization, the autoclave was cooled to stop the polymerization reaction, and the gas in the system was purged to obtain a solution of polymer (F-8).

To the solution of polymer (F-8), 203 g of AC2000 was added and mixed. The temperature of the polymer solution was 25° C. This polymer solution was added to 1,078 g of AE3000 at room temperature to coagulate polymer (F-8), to form particles. The liquid containing particles of polymer (F-8) was filtered. To the obtained particles of polymer (F-8), 275 g of AE3000 was added, stirred and then filtered. The obtained particles of polymer (F-8) were dried under reduced pressure for 16 hours at 140° C. to obtain 15.43 g of polymer (F-8).

In the same manner as in Ex. 1 except that polymer (F-8) was used instead of polymer (F-1), a membrane of polymer (I-8) having —$SO_2F$ groups in the membrane of polymer (F-8) converted to sulfonic acid groups, was obtained.

Ex. 9

Into a stainless steel autoclave with an internal capacity of 1,006 mL, 421.8 g of P2SVE was charged and degassed at room temperature. While cooling with ice water, 72.6 g of PHVE and 178.0 g of AK225G were charged under reduced pressure and degassed under reduced pressure until the vapor pressure. After heating to 40° C., TFE was introduced until the pressure became 0.42 MPaG. After confirming that the pressure did not change, from an addition line attached to the autoclave, 1.34 g of an AK225G solution having 341.6 mg of IPP dissolved therein was added under pressure by nitrogen gas, and then, 10.0 g of AK225G was added to wash the addition line. While maintaining the temperature and pressure to be constant, TFE was continuously supplied and polymerized. After 8.5 hours from initiation of the polymerization, the autoclave was cooled to stop the polymerization reaction, and the gas in the system was purged to obtain a solution of polymer (F-9).

To the solution of polymer (F-9), 394 g of AC2000 was added and mixed. The temperature of the polymer solution was 25° C. This polymer solution was added to 1,616 g of AE3000 at room temperature to coagulate polymer (F-9), to form particles. The liquid containing particles of polymer (F-9) was filtered. To the obtained particles of polymer (F-9), 700 g of AE3000 was added, stirred and then filtered for washing. The washing operation was repeated twice. The obtained particles of polymer (F-9) were dried under reduced pressure for 16 hours at 140° C. to obtain 110 g of polymer (F-9).

In the same manner as in Ex. 1 except that polymer (F-9) was used instead of polymer (F-1), a membrane of polymer (I-9) having —$SO_2F$ groups in the membrane of polymer (F-9) converted to sulfonic acid groups, was obtained.

Ex. 10

Production of Polymer (F-10):

Into a stainless steel autoclave with an internal capacity of 1,006 mL, 612.3 g of P2SVE and 105.01 g of PDVE-5E were charged and degassed under reduced pressure at room temperature. After heating to 40° C., TFE was introduced until the pressure became 0.92 MPaG. After confirming that the pressure did not change, from an addition line attached to the autoclave, 5.0 g of an AC2000 solution having 147.8 mg of V601 dissolved therein was added under pressure by nitrogen gas, and then, 16.9 g of AC2000 was added to wash the addition line. While maintaining the temperature and pressure to be constant, TFE was continuously supplied and polymerized. After 6 hours from initiation of the polymerization, the autoclave was cooled to stop the polymerization reaction, and the gas in the system was purged to obtain a solution of polymer (F-10).

To the solution of polymer (F-10), 700 g of AC2000 was added and mixed. The temperature of the polymer solution was 25° C. This polymer solution was added to 2,300 g of AE3000 at −20° C. to coagulate polymer (F-10), to form particles. The liquid containing particles of polymer (F-10) was filtered. To the obtained particles of polymer (F-10), 500 g of AE3000 was added, stirred and then filtered for washing. The washing operation was repeated twice. The obtained particles of polymer (F-10) were dried under reduced pressure for 16 hours at 140° C. to obtain 125.6 g of polymer (F-10).

In the same manner as in Ex. 1 except that polymer (F-10) was used instead of polymer (F-1), a membrane of polymer (I-10) having —SO$_2$F groups in the membrane of polymer (F-10) converted to sulfonic acid groups, was obtained.

Ex. 11

Production of Polymer (F-11):

Into a stainless steel autoclave with an internal capacity of 1,006 mL, 351.61 g of P2SVE was charged and degassed under reduced pressure at room temperature. While cooling with ice water, 204.71 g of PSVE and 50.0 g of AK225G were charged and degassed under reduced pressure until the vapor pressure. After heating to 66° C., TFE was introduced until the pressure became 1.13 MPaG. After confirming that the pressure did not change, from an addition line attached to the autoclave, 5.0 g of an AK225G solution having 62.2 mg of V601 dissolved therein was added under pressure by nitrogen gas, and then, 10.0 g of AK225G was added to wash the addition line. While maintaining the temperature and pressure to be constant, TFE was continuously supplied and polymerized. After 5 hours from initiation of the polymerization, the autoclave was cooled to stop the polymerization reaction, and the gas in the system was purged to obtain a solution of polymer (F-11).

To the solution of polymer (F-11), 300 g of AK225G was added and mixed. The temperature of the polymer solution was 25° C. This polymer solution was added to 900 g of AK141b to coagulate polymer (F-11), to form particles. The liquid containing particles of polymer (F-11) was filtered. To the obtained particles of polymer (F-11), a mixture of 150 g of AK225G and 350 g of AK141b, was added, stirred and then filtered for washing. The washing operation was repeated twice. The obtained particles of polymer (F-11) were dried under reduced pressure for 16 hours at 140° C. to obtain 67.3 g of polymer (F-11).

In the same manner as in Ex. 1 except that polymer (F-11) was used instead of polymer (F-1), a membrane of polymer (I-11) having —SO$_2$F groups in the membrane of polymer (F-11) converted to sulfonic acid groups, was obtained.

TABLE 1

| | | | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|---|
| Polymer (F) | Composition (molar ratio) | TEF units | 77.65 | 69.2 | 67.5 | 70.2 | 75.8 | 74.0 | 68.09 | 85.3 | 82.5 | 78.2 | 82.9 |
| | | Units (u'1-2) | 13.35 | 13.4 | 12.3 | 14.8 | 13.6 | 15.0 | 8.35 | 11.6 | 13.1 | 17.7 | 9.4 |
| | | Units (u'2-1) | 9 | 17.4 | 20.2 | | | | 23.56 | 3.1 | | | |
| | | Units (u'2-2) | | | | 15.0 | 10.6 | | | | | | |
| | | Units (u'2-3) | | | | | | 11.0 | | | 4.4 | | |
| | | Units (u'2-4) | | | | | | | | | | 4.1 | |
| | | Units (u'-3) | | | | | | | | | | | 7.7 |
| | | TQ value [° C.] | 209 | 255 | 260 | 201 | 224 | 240 | 250 | 319 | 253 | 194 | 247 |
| Polymer (I) | Molar ratio (u2)/((u1) + (u2)) | | 0.40 | 0.56 | 0.62 | 0.50 | 0.44 | 0.42 | 0.74 | 0.21 | 0.25 | 0.19 | — |
| | AR [meq/g dry resin] | | 1.52 | 1.47 | 1.38 | 1.46 | 1.44 | 1.39 | 1.05 | 1.42 | 1.43 | 1.68 | 1.51 |
| | EW [g dry resin/eq] | | 660 | 679 | 724 | 685 | 695 | 718 | 955 | 703 | 700 | 596 | 664 |
| Elastic modulus [MPa] | 3% RH | | 24.1 | 18.8 | 18.9 | 17.3 | 24.4 | 19.8 | 10 | 95.3 | 44.6 | 33 | 84 |
| | 90% RH | | 17 | 10.0 | 14.7 | 12.8 | 15.3 | 6.3 | 12 | 37.5 | 20.1 | 12 | 27.9 |
| | Difference in elastic modulus | | 7.1 | 8.8 | 4.2 | 4.5 | 9.1 | 13.5 | 2 | 57.8 | 24.5 | 21 | 56.1 |
| Conductivity [S/cm] | | | 0.104 | 0.110 | — | — | — | — | — | — | — | — | — |
| Water content [mass %] | | | 104 | 98.0 | 98.0 | 124.0 | 139.6 | — | — | — | — | — | — |
| Storage elastic modulus [MPa] | | | 56 | 33 | 16 | 16 | 28 | 7 | — | 100 | — | — | 95 |

As shown in Table 1, in the polymer membrane in each of Ex. 1 to 6 wherein the molar ratio (u2)/((u1)+(u2)) was more than 0.30 and at most 0.70, as compared with the polymer membrane in each of Ex. 8 to 10 wherein the molar ratio was less than 0.30, the difference in elastic modulus between the case where the humidity was 90% RH and the case where the humidity was 3% RH, was small.

Ex. 12

Into a 200 mL glass autoclave, 14.8 g of the membrane of polymer (I-2) obtained in Ex. 2 and finely cut, and 75.77 g of a mixed solvent of ethanol/water (70/30 (mass ratio)), were added, and while stirring, the autoclave was heated. After stirring at 100° C. for 6.5 hours, 12.8 g of water was added. After stirring for 16 hours, the autoclave was left to cool, followed by filtration by using a filter press (filter paper: PF040, manufactured by Advantec Toyo Kaisha, Ltd.) to obtain 103 g of a liquid composition having polymer (I-2) dispersed at 14 mass % in the mixed solvent.

The liquid composition was applied on a substrate film by using a die coater and dried for 30 minutes in a drying oven at 120° C. Thereafter, heat treatment was conducted for 30 minutes in a drying oven at 180° C., to obtain a polymer electrolyte membrane made of polymer (I-2) and having a membrane thickness of 25 μm.

A polymer having —SO$_2$F groups in the PSVE/TFE copolymer (AR: 1.1 meq/g dry resin) converted to sulfonic acid groups, was obtained in the same manner as in Ex. 1 except that instead of the aqueous solution containing 15 mass % of methanol and 10 mass % of potassium hydroxide, an aqueous solution containing 30 mass % of dimethyl sulfoxide and 15 mass % of potassium hydroxide, was used.

The obtained polymer was dispersed in a mixed dispersion medium of ethanol/water=60/40 (mass ratio), so that the solid content concentration became 25.8 mass %, to obtain a liquid composition (L-12).

To 44 g of a supported catalyst (manufactured by Tanaka Kikinzoku Kogyo K.K., trade name: TEC10E50E) having 46 mass % platinum supported on carbon powder, 221.76 g of water and 174.24 g of ethanol were added, and mixed and pulverized by using an ultrasonic homogenizer, to obtain a catalyst dispersion.

80.16 g of the liquid composition (L-12), 44.4 g of ethanol and 25.32 g of ZEORORA-H (manufactured by Zeon Corporation) were mixed and kneaded to obtain a mixed liquid. 102.06 g of the mixed liquid was added to the above catalyst dispersion, and so that the solid content concentration would be 10 mass %, 26.77 g of water and 12 g of ethanol were added, followed by mixing by using an ultrasonic homogenizer to obtain a coating liquid for forming a catalyst layer. The coating liquid for forming a catalyst layer was applied to an ETFE sheet by a die coater, then dried at 80° C., and further subjected to heat treatment at 150° C. for 15 minutes, to obtain a catalyst layer-attached ETFE sheet with the amount of platinum being 0.4 mg/cm².

To 50 g of vapor-grown carbon fibers (manufactured by SHOWA DENKO K.K., tradename: VGCF-H, fiber diameter: about 150 nm, fiber length: 10 to 20 μm), 81.6 g of ethanol and 154.4 g of distilled water were added and thoroughly stirred. Thereto, 89 g of a liquid composition obtained by dispersing a polymer having TFE units and units (u1) (ion-exchange groups: acid form sulfonic acid groups, ion exchange capacity: 1.1 meq/g dry resin) in a mixed solvent of ethanol/water=60/40 (mass ratio) so that the solid content concentration would be 28.1 mass %, was added and thoroughly stirred. Then, mixing and pulverization were conducted by using an ultrasonic homogenizer to prepare a coating liquid for forming an intermediate layer.

On the surface of a gas diffusion layer (manufactured by NOK Corporation, trade name: X0086 T10X13), the coating liquid for forming an intermediate layer was applied so that the solid content would be 3 mg/cm² by using a die coater and dried at 80° C., to prepare an intermediate layer-attached gas diffusion layer having the intermediate layer formed on the gas diffusion layer surface.

The above polymer electrolyte membrane was sandwiched from both sides respectively by two sheets of the catalyst layer-attached ETFE sheet and heat-pressed under conditions of a press temperature of 160° C., for a pressing time of 2 minutes under a pressure of 3 MPa, to bond the catalyst layers to both surfaces of the polymer electrolyte membrane. ETFE films were peeled off from the catalyst layers bonded to the polymer electrolyte membrane, to obtain a membrane-catalyst layer assembly with an electrode area of 25 cm².

A membrane/electrode assembly to be subjected to the evaluation of power generation characteristics, was obtained by arranging so that the carbon layer of the carbon layer-attached gas diffusion substrate (manufactured by NOK Corporation, trade name: X0086 IX92 CX320) would be in contact with the catalyst layer on the anode side of the above membrane-catalyst layer assembly, and arranging so that the intermediate layer of the intermediate layer-attached gas diffusion layer would be in contact with the catalyst layer on the cathode-side, followed by pressing for 2 minutes under conditions of 160° C. under 3 MPa.

A membrane/electrode assembly to be subjected to the wet-dry cycle test, was obtained by sandwiching by arranging gas diffusion substrates (manufactured by Toray Industries Inc. registered trademark, TGP-H-60) to the membrane/catalyst layer assembly, so that they would, respectively, be in contact with the anode side catalyst layer and the cathode side catalyst layer, and further, arranging gas diffusion layers so as to be in contact with the respective gas diffusion substrates.

The evaluation results of the power generation performance of the power generation cell having the membrane/electrode assembly in Ex. 12 incorporated and the wet-dry cycle test, are shown in Table 2. Similarly, also with respect to the following Ex., the evaluation results are shown in Table 2.

Ex. 13

A membrane/electrode assembly was obtained in the same manner as in Ex. 12, except that instead of using the polymer electrolyte membrane with a thickness of 25 μm, a polymer electrolyte membrane with a thickness of 5 μm, was used.

Ex. 14

Into a 1,000 mL glass autoclave, 103.8 g of the membrane of polymer (I-1) obtained in Ex. 1 and finely cut, and 545.3 g of a mixed solvent of ethanol/water (70/30 (mass ratio)), were added, and the autoclave was heated with stirring. After stirring at 110° C. for 7 hours, 92.0 g of water was added. After stirring for 16 hours, the autoclave was left to cool, followed by filtration by using a filter press (filter paper: PF040 manufactured by Advantec Toyo Kaisha, Ltd.) to obtain 741 g of a liquid composition having polymer (I-1) dispersed at 14 mass % in the mixed solvent.

The liquid composition was applied on a substrate film using a die coater and dried for 30 minutes in a drying oven at 120° C. Thereafter, heat treatment was conducted for 30 minutes in a drying oven at 180° C., to obtain a polymer electrolyte membrane made of polymer (I-1) and having a thickness of 5 μm.

In the same manner as in Ex. 12, a membrane/electrode assembly to be subjected to the wet-dry cycle test was obtained.

Ex. 15

Into a 1,000 mL glass autoclave, 53.85 g of the membrane of polymer (I-10) obtained in Ex. 10 and finely cut, and 262.9 g of a mixed solvent of ethanol/water (60/40 (mass ratio)), were added, and the autoclave was heated with stirring. After stirring at 105° C. for 6 hours, 68.0 g of water was added. After stirring for 16 hours, the autoclave was left to cool, followed by filtration by using a filter press (filter paper: PF040 manufactured by Advantec Toyo Kaisha, Ltd.) to obtain 385 g of a liquid composition having polymer (I-10) dispersed at 14 mass % in the mixed solvent.

The liquid composition was applied on a substrate film by using a die coater and dried for 30 minutes in a drying oven at 120° C. Thereafter, heat treatment was conducted for 30 minutes in a drying oven at 180° C., to obtain a polymer electrolyte membrane made of polymer (I-10) and having a thickness of 5 μm.

In the same manner as in Ex. 12, a membrane/electrode assembly to be subjected to the wet-dry cycle test, was obtained.

Ex. 16

Into a 200 mL glass autoclave, 14.2 g of the membrane of polymer (I-11) obtained in Ex. 11 and finely cut, and 81.11 of a mixed solvent of ethanol/water (60/40 (mass ratio)), were added, and the autoclave was heated with stirring. After stirring at 120° C. for 16 hours, 12.4 g of water was added. After stirring for 1 hour, the autoclave was left to cool, followed by filtration by using a filter press (filter paper: PF040 manufactured by Advantec Toyo Kaisha, Ltd.) to obtain 108 g of a liquid composition having polymer (I-11) dispersed at 13.2 mass % in the mixed solvent.

The liquid composition was applied on a substrate film by using a die coater and dried for 30 minutes in a drying oven at 120° C. Thereafter, heat treatment was conducted for 30 minutes in a drying oven at 180° C., to obtain a polymer electrolyte membrane made of polymer (I-11) and having a thickness of 5 μm.

In the same manner as in Ex. 12, a membrane/electrode assembly to be subjected to the wet-dry cycle test, was obtained.

TABLE 2

| Type of polymer | | Ex. 12 I-2 | Ex. 13 I-2 | Ex. 14 I-1 | Ex. 15 I-10 | Ex. 16 I-11 |
|---|---|---|---|---|---|---|
| Power generation characteristics | Membrane thickness [μm] | 25 | 5 | 5 | 5 | 5 |
| | Current density [A/cm²] | 1.2 | 1.4 | — | — | — |
| Wet-dry cycle test | | — | ○ | ○ | x | x |

As shown in Table 2, by the cell for power generation comprising the membrane/electrode assembly in Ex. 12 or 13 using polymer (I-2) in the polymer electrolyte membrane, the current density was high and sufficient power generation performance was obtained. In Ex. 13 or Ex. 14, by the membrane/electrode assembly comprising a polymer electrolyte membrane of polymer (I-2) or (I-1) having a membrane thickness of 5 μm, the results of the wet-dry cycle test were good.

This application is a continuation of PCT Application No. PCT/JP2017/033560, filed on Sep. 15, 2017, which is based upon and claims the benefit of priority from Japanese Patent Application No. 2016-188161 filed on Sep. 27, 2016. The contents of those applications are incorporated herein by reference in their entireties.

REFERENCE SYMBOLS

10: Membrane/electrode assembly, 11: catalyst layer, 12: gas diffusion layer, 13: anode, 14: cathode, 15: polymer electrolyte membrane, 16: carbon layer.

What is claimed is:

1. A polymer having units represented by the following formula (u1) and units represented by the following formula (u2), wherein a molar ratio (u2)/((u1)+(u2)) of the units represented by the formula (u2) to a total of the units represented by the formula (u1) and the units represented by the formula (u2) is more than 0.30 and at most 0.70,

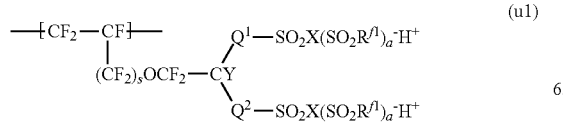
(u1)

(u2)

wherein $Q^1$ is a perfluoroalkylene group which may have an etheric oxygen atom, $Q^2$ is a single bond, or a perfluoroalkylene group which may have an etheric oxygen atom, $R^{f1}$ is a perfluoroalkyl group which may have an etheric oxygen atom, X is an oxygen atom, a nitrogen atom or a carbon atom, a is 0 when X is an oxygen atom, 1 when X is a nitrogen atom, or 2 when X is a carbon atom, Y is a fluorine atom or a monovalent perfluoro organic group, s is 0 or 1, $R^{f2}$ is a monovalent perfluoro organic group which does not contain an ion exchange group, Z is a fluorine atom or a monovalent perfluoro organic group, and t is an integer of from 0 to 3, wherein the polymer further has units derived from tetrafluoroethylene, wherein a proportion of the units derived from tetrafluoroethylene is from 60 to 85 mol % to a total of all units in the polymer.

2. The polymer according to claim 1, wherein both of $Q^1$ and $Q^2$ in the above formula (u1) are a perfluoroalkylene group having an etheric oxygen atom.

3. The polymer according to claim 1, wherein $R^{f2}$ is a $C_{1-8}$ monovalent perfluoro organic group.

4. The polymer according to claim 1, of which an equivalent weight is from 400 to 900 g dry resin/equivalent.

5. The polymer according to claim 1, of which a difference between an elastic modulus at 80° C. and at a humidity of 3% RH, and an elastic modulus at 80° C. and at a humidity of 90% RH, is from 2 to 20 MPa.

6. The polymer according to claim 1, of which a conductivity under conditions of a temperature of 80'C and a humidity of 50% RH, is at least 0.01 S/cm.

7. The polymer according to claim 1, of which a water content is from 10 to 500 mass %.

8. The polymer according to claim 1, of which a storage elastic modulus at a temperature of 80° C., is from 5 to 90 MPa.

9. A polymer electrolyte membrane comprising the polymer as defined in claim 1.

10. The polymer electrolyte membrane according to claim 9, of which the thickness is less than 25 μm.

11. A membrane/electrode assembly for a polymer electrolyte fuel cell, comprising an anode having a catalyst layer, a cathode having a catalyst layer, and a polymer electrolyte membrane disposed between the anode and the cathode, wherein the polymer electrolyte membrane comprises the polymer as defined in claim 1.

12. A membrane/electrode assembly for a polymer electrolyte fuel cell, comprising an anode having a catalyst layer, a cathode having a catalyst layer, and a polymer electrolyte membrane disposed between the anode and the cathode, wherein the catalyst layer of either one or each of the anode and the cathode, comprises the polymer as defined in claim 1.

13. A membrane/electrode assembly for a polymer electrolyte fuel cell, comprising an anode having a catalyst layer, a cathode having a catalyst layer, and a polymer electrolyte membrane disposed between the anode and the cathode, wherein the polymer electrolyte membrane and the catalyst layer of either one or each of the anode and the cathode, comprise the polymer as defined in claim 1.

14. The polymer according to claim 1, wherein the proportion of the units derived from tetrafluoroethylene is from 67.5 to 85 mol % to the total of all units in the polymer.

* * * * *